United States Patent
Imano et al.

(10) Patent No.: US 12,090,553 B2
(45) Date of Patent: Sep. 17, 2024

(54) MANUFACTURING METHOD OF ALLOY POWDER

(71) Applicant: TOKIN CORPORATION, Shiroishi (JP)

(72) Inventors: Yosuke Imano, Tokyo (JP); Akiri Urata, Tokyo (JP); Masato Kuno, Tokyo (JP)

(73) Assignee: TOKIN CORPORATION, Miyagi (JP)

( * ) Notice: Subject to any disclaimer, the term of this patent is extended or adjusted under 35 U.S.C. 154(b) by 7 days.

(21) Appl. No.: 17/853,646

(22) Filed: Jun. 29, 2022

(65) Prior Publication Data
US 2023/0016451 A1 Jan. 19, 2023

(30) Foreign Application Priority Data

Jul. 6, 2021 (JP) ................................ 2021-111996

(51) Int. Cl.
*B22F 9/06* (2006.01)
(52) U.S. Cl.
CPC ...................... *B22F 9/06* (2013.01)
(58) Field of Classification Search
CPC ................... B22F 9/06; B22F 9/082
See application file for complete search history.

(56) References Cited

U.S. PATENT DOCUMENTS

| | | | | |
|---|---|---|---|---|
| 4,405,535 A | * | 9/1983 | Raman | B22F 9/10 264/13 |
| 5,180,539 A | * | 1/1993 | Yoshino | B22F 9/10 425/7 |
| 2009/0075101 A1 | * | 3/2009 | Kulkarni | C23C 28/321 428/457 |
| 2010/0043927 A1 | | 2/2010 | Makino | |

FOREIGN PATENT DOCUMENTS

| | | | | |
|---|---|---|---|---|
| JP | H08209208 A | * | 8/1996 | ............ B22F 9/08 |
| JP | 4584350 B2 | | 11/2010 | |

* cited by examiner

*Primary Examiner* — Brian D Walck
*Assistant Examiner* — Nazmun Nahar Shams
(74) *Attorney, Agent, or Firm* — Holtz, Holtz & Volek PC

(57) ABSTRACT

A manufacturing method of alloy powder comprises a liquid film forming step, a supplying step and a dividing step. In the liquid film forming step, a high speed fluid made of coolant liquid is shaped into a liquid film which has a predetermined thickness of 0.1 mm or more and receives a predetermined acceleration of $2.0 \times 10^4$ G or more along a thickness direction. In the supplying step, molten alloy which is not divided into a size of the predetermined thickness or less is supplied to the liquid film. In the dividing step, the molten alloy is divided into the size of the predetermined thickness or less by the high speed fluid to make alloy particles and keeping the alloy particles in the liquid film by the predetermined acceleration so that the alloy particles are continuously cooled in the high speed fluid.

10 Claims, 1 Drawing Sheet

MANUFACTURING METHOD OF ALLOY POWDER

CROSS REFERENCE TO RELATED APPLICATIONS

This application is based on and claims priority under 35 U.S.C. § 119 to Japanese Patent Applications No. JP 2021-111996 filed Jul. 6, 2021, the content of which is incorporated herein in its entirety by reference.

BACKGROUND OF THE INVENTION

This invention relates to a manufacturing method of alloy powder.

For example, an existing manufacturing method of alloy powder is disclosed in JP 4584350 B (Patent Document 1), the content of which is incorporated herein by reference.

A water atomizing method and a gas atomizing method such as those shown in Patent Document 1 are known as general manufacturing methods of alloy powder.

However, alloy powder manufactured by the water atomizing method or the gas atomizing method often varies in quality.

SUMMARY OF THE INVENTION

It is therefore an object of the present invention to provide a new manufacturing method of alloy powder which is capable of reducing variation in quality.

An aspect of the present invention provides a manufacturing method of alloy powder, the manufacturing method comprising: shaping a high speed fluid made of coolant liquid into a liquid film which has a predetermined thickness of 0.1 mm or more and receives a predetermined acceleration of $2.0 \times 10^4$ G or more along a thickness direction; supplying the liquid film with molten alloy which is not divided into a size of the predetermined thickness or less; and dividing the molten alloy into the size of the predetermined thickness or less by the high speed fluid to make alloy particles and keeping the alloy particles in the liquid film by the predetermined acceleration so that the alloy particles are continuously in contact with the high speed fluid to be cooled.

The existing atomizing method is a rapid cooling method in which gas or water is used to divide molten alloy into particles and thereafter coolant liquid such as coolant water is used to rapidly cool the particles. However, the divided particles have different cooling rates from each other because of difference in particle sizes. In addition, the divided particles will fall on different points from each other with different speeds from each other. Therefore, the divided particles are cooled in atmosphere by different times from each other until they fall on the coolant liquid. The aforementioned various reasons cause the particles to be vary in quality.

In contrast, according to an aspect of the present invention, the molten alloy is supplied to the liquid film without being pre-divided. Thereafter, the high speed fluid divides the thus-supplied molten alloy into the particles which are simultaneously cooled by the liquid film. Thus, according to an aspect of the present invention, the molten alloy is substantially simultaneously divided and cooled so that the particles are prevented from being differently cooled from each other. As described above, an aspect of the present invention provides a new manufacturing method of alloy powder which is capable of reducing variation in quality.

If the divided particles are not properly cooled in the liquid film, the particles before complete solidification might hit a portion located at the bottom of the liquid film and thereby might have irregular shapes. In order to solve the aforementioned problem, the predetermined acceleration along the thickness direction of the liquid film is designed to be $2.0 \times 10^4$ G or more, and the predetermined thickness of the liquid film is designed to be 0.1 mm or more. According to the aforementioned design, a proper cooling ability can be obtained, and thereby the particles will complete solidify before they hit the portion located at the bottom of the liquid film. The aforementioned design provides a new manufacturing method of alloy powder which is capable of reducing variation in shape to some extent.

An appreciation of the objectives of the present invention and a more complete understanding of its structure may be had by studying the following description of the preferred embodiment and by referring to the accompanying drawings.

Figure 1:
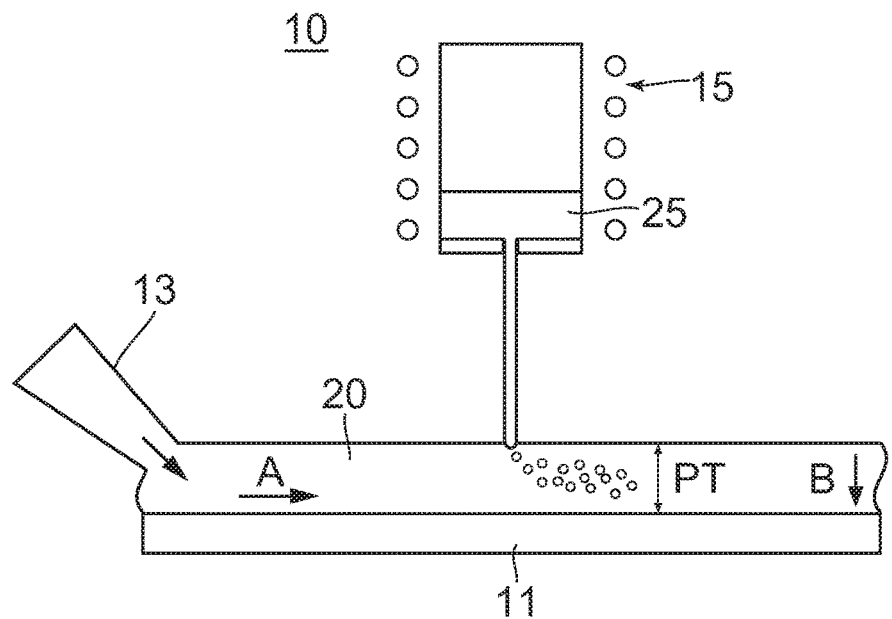
FIG. 1 is a view for explaining a manufacturing method of alloy powder according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Summarizing a manufacturing method of alloy powder of an embodiment of the present invention, molten alloy is divided into alloy particles by a liquid film formed of a high speed fluid and is simultaneously cooled by the liquid film.

As shown in FIG. 1, alloy powder manufacturing equipment 10 of the present embodiment comprises a base portion 11, a nozzle 13 and an alloy supplying portion 15. The nozzle 13 discharges coolant liquid onto the base portion 11 with high pressure. The thus-discharged coolant liquid flows along a direction indicated by an array A with high speed so as to form a high speed fluid. The high speed fluid made of the coolant liquid is shaped into a liquid film 20 which has a predetermined thickness PT. The alloy powder manufacturing equipment 10 is configured so that the thus-formed liquid film 20 receives a predetermined acceleration along a thickness direction of the liquid film 20, or a direction along an array B.

Meanwhile, the alloy supplying portion 15 discharges molten alloy 25. The liquid film 20 is supplied with the thus-discharged molten alloy 25 which is not divided into a size of the predetermined thickness PT or less. As can be seen from the explanation described above, a certain mass of the molten alloy 25 is kept as it is and is supplied to the liquid film 20 in contrast with the existing rapid cooling atomizing method in which the molten alloy 25 is divided into particles before the particles fall on and are cooled rapidly by the liquid film 20. When a certain mass of the molten alloy 25 is kept as it is and is supplied to the liquid film 20 as described above, the molten alloy 25 is divided into the size of the predetermined thickness PT or less by the high speed fluid of the liquid film 20 to make the alloy particles. At the same time, the thus-made alloy particles are brought into contact with and cooled by the liquid film 20. Meanwhile, the coolant liquid around the alloy particles is instantaneously evaporated. However, the liquid film 20 of the present embodiment continuously receives the predetermined acceleration. As a result, even after the coolant liquid around the alloy particles is evaporated, the alloy particles is kept being pressed against and being in contact with the coolant liquid of the high speed fluid. As described above, the alloy particles are kept in the liquid film 20 by the predetermined acceleration so that the alloy particles are continuously in contact with the high speed fluid to be cooled.

The existing rapid cooling atomizing method has a drawback that it is expensive. For example, large manufacturing facilities are often required. In addition, high-pressure gas facilities and gas expense are required. Moreover, because the divided particles are considerably cooled before fall on the liquid film 20, there is a problem that cooling rate of the particles after fall on the liquid film 20 is lowered. In contrast, in the present embodiment, the molten alloy 25 is substantially simultaneously divided and cooled in the liquid film 20, and thereby difference in the cooling rate among the particles is reduced. Accordingly, homogeneous particles can be obtained.

In a situation where the divided particles are insufficiently cooled in the liquid film 20, the particles would hit the base portion 11 which is located at the bottom of the liquid film 20 before they completely solidify. The thus-hit particles might have irregular shapes. According to the present embodiment, in order to solve this problem, the predetermined acceleration along the thickness direction of the liquid film 20, or the direction along the array B, is designed to be $2.0 \times 10^4$ G, and the predetermined thickness PT of the liquid film 20 is designed to be 0.1 mm or more. Sufficient cooling ability can be obtained under the condition where the predetermined acceleration is $2.0 \times 10^4$ G or more. The irregular shape particles can be reduced in number under the condition where the predetermined thickness PT of the liquid film 20 is 0.1 mm or more since divided droplets will not hit an inner wall of a tank before solidification. According to the present embodiment, the particles solidify to have sphere shapes or almost sphere shapes before they fall on the base portion 11 located at the bottom of the liquid film 20 as described above. The thus-obtained particles are sufficiently uniform in their shapes. The manufacturing method of the alloy powder of the present embodiment described above is particularly suitable to make a soft magnetic powder.

Figure 2:
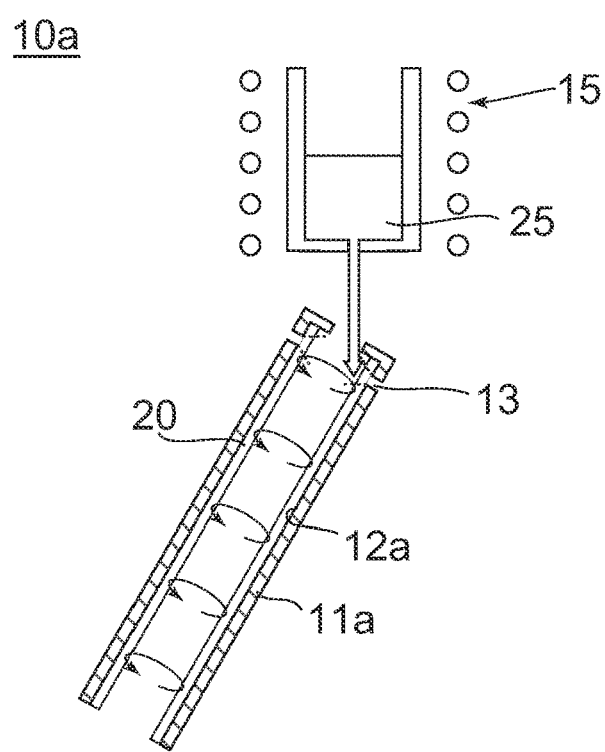
FIG. 2 is a view showing an example of alloy powder manufacturing equipment according to another embodiment of the present invention.

For example, as shown in FIG. 2, alloy powder manufacturing equipment 10a may be used so that the predetermined acceleration is applied to the liquid film 20. The alloy powder manufacturing equipment 10a of FIG. 2 comprises a drum 11a of a cylindrical shape. The drum 11a has an inner wall 12a which works as the aforementioned base portion. The liquid film 20 is formed by continuously supplying the coolant liquid from the nozzle 13 onto the inner wall 12a of the drum 11a. When the liquid film 20 is formed as described above, the liquid film 20 is applied with a centrifugal acceleration directed toward the inner wall 12a of the drum 11a. This centrifugal acceleration works as the aforementioned the predetermined acceleration. In other words, the predetermined acceleration of the alloy powder manufacturing equipment 10a is the centrifugal acceleration. The alloy particles can be efficiently and continuously cooled by a device with simple structure by using the centrifugal acceleration as the predetermined acceleration as described above.

According to a preferred embodiment, the coolant liquid has initial velocity of 80 m/s or more when supplied from the nozzle 13, and the predetermined acceleration is $1.0 \times 10^7$ G or less. If the initial velocity of the coolant liquid is less than 80 m/s, the coolant liquid has poor ability to divide the molten alloy 25. Such poor ability makes the divided droplets in the liquid film 20 large, and thereby the droplets are more frequently deformed during cooling. As a result, excessively large particles each having a long shape increase in number. Thus, irregular shape particles are easily made. In contrast, when the initial velocity of the coolant liquid is 80 m/s or more, sufficient ability to divide the molten alloy 25 is obtained, and thereby the particles of sphere shapes or almost sphere shapes can be obtained.

In particular, in an instance where the initial velocity of the coolant liquid supplied from the nozzle 13 is 100 m/s or more, the particles are sufficiently made fine, and amorphous property and magnetic characteristics thereof are improved. Therefore, the initial velocity of the coolant liquid is more preferred to be 100 m/s or more. However, in an instance where the initial velocity of the coolant liquid supplied from the nozzle 13 is more than 800 m/s, although very small particles are made, the particles of thread-like shapes increase in number. Therefore, the initial velocity of the coolant liquid is more preferred to be 800 m/s or less.

The predetermined acceleration of the liquid film 20 is more preferred to be $3.0 \times 10^4$ G or more. As the predetermined acceleration is made high, cooling ability can be improved. The thus-achieved high cooling ability has advantage that an alloy can be formed with amorphous phase even if the alloy has a composition which has low amorphous forming capability.

The predetermined thickness PT is preferred to be 0.8 mm or more. In an instance where the predetermined thickness PT of the liquid film 20 is 0.8 mm or more, the divided droplets spread over a wide range in the liquid film 20, and thereby the divided droplets can be prevented from colliding with each other to be shaped into irregular shapes. The predetermined thickness PT is more preferred to be 15 mm or less. If the predetermined thickness PT is excessively thick, the fluid flow velocity on the surface of the liquid film 20 is rather different from the fluid flow velocity in the liquid film 20, and thereby each of the divided droplets is easily made long during cooling so that the particles might have irregular shapes.

For example, when the drum 11a is used as shown in the alloy powder manufacturing equipment 10a of FIG. 2, the drum 11a is preferred to have an inner diameter between 10 mm and 100 mm (both inclusive) and is more preferred to have the inner diameter between 20 mm and 60 mm (both inclusive). When the inner diameter of the drum 11a is made small, the centrifugal acceleration is made large, and thereby amorphous property of the manufactured alloy powder is improved. In an instance where the inner diameter of the drum 11a is 100 mm or less, the aforementioned advantage becomes noticeable, and the particles with good amorphous property can be made even if the molten alloy 25 has a composition in which Fe amount is 80 at % or more. When the inner diameter of the drum 11a is 60 mm or less, the amorphous property of the manufactured alloy powder is further improved. As the inner diameter of the drum 11a is made smaller, the amorphous property is more improved.

However, when the inner diameter is less than 10 mm, the molten alloy 25 cannot be easily supplied into the actual drum 11a. Therefore, the inner diameter of the drum 11a is preferred to be 10 mm or more. From a viewpoint of stably supplying the liquid film 20 with the molten alloy 25, the inner diameter of the drum 11a is preferred to be 20 mm or more.

When a supply rate of the molten alloy 25 is made lower than another supply rate of the high speed fluid made of the coolant liquid, increase of liquid temperature can be reduced. In addition, the high speed fluid is not disturbed, and thereby the alloy particles can be stably made and cooled. From the aforementioned viewpoint, the supply rate of the high speed fluid is preferred to be 15 times or more than the supply rate of the molten alloy 25. The supply rate of the high speed fluid is preferred to be 40 times or more than the supply rate of the molten alloy 25 so that the alloy particles are more stably made. The alloy particles can be made even if velocity of the molten alloy 25 is generated as a result of a free fall of the molten alloy 25 due to its own weight.

There is no mechanical restriction about atmosphere in which the molten alloy 25 is supplied to the liquid film 20. For example, the alloy particles can be easily shaped in sphere shapes even in the air. In an inactive atmosphere, the alloy particles not only can be shaped in sphere shapes but also can be prevented from being oxidized. However, considering productivity and manufacturing cost, the liquid film 20 is preferred to be supplied with the molten alloy 25 in an oxidizing atmosphere of 100 ppm or more.

When the liquid film 20 is supplied with the molten alloy 25, the molten alloy 25 can be stably supplied by intersecting a flowing direction of the molten alloy 25 with the liquid film 20. In other words, the flowing direction of the molten alloy 25 is preferred to intersect with the liquid film 20 by a predetermined dividing angle. When this dividing angle is made large, the alloy particles can be made fine. From the aforementioned viewpoint, the flowing direction of the supplied molten alloy 25 is preferred to intersect with the liquid film 20 by an angle between 10 and 90 degrees (both inclusive).

When the liquid film 20 is supplied with the molten alloy 25, the molten alloy 25 is preferred to be supplied only onto a predetermined region of the liquid film 20, the predetermined region having a diameter of 15 mm or less. When the molten alloy 25 is supplied onto an area located within the predetermined region as described above, the alloy particles can be made stable in quality, and the drum 11a for forming the liquid film 20 can be reduced in size. The diameter of the predetermined region is more preferred to be 10 mm or less.

Examples 1 to 19 and Comparative Examples 1 to 3

By using the manufacturing method of the alloy powder according to the aforementioned embodiment of the present invention, the alloy powder was manufactured under conditions as shown in Table 1 attached below. The thus-manufactured alloy powder was estimated as shown in Table 2.

TABLE 1

| | alloy | inner diameter of drum [mm] | water velocity [m/s] | acceleration [G] |
|---|---|---|---|---|
| Comparative Example 1 | Fe—B—P—Cu | 300 | 170 | $1.97 \times 10^4$ |
| Example 1 | Fe—B—P—Cu | 100 | 170 | $5.9 \times 10^4$ |
| Example 2 | Fe—B—P—Cu | 60 | 170 | $9.83 \times 10^4$ |
| Example 3 | Fe—B—P—Cu | 20 | 620 | $3.92 \times 10^6$ |
| Example 4 | Fe—B—P—Cu | 40 | 430 | $9.43 \times 10^5$ |
| Example 5 | Fe—B—P—Cu | 40 | 280 | $4.00 \times 10^5$ |
| Example 6 | Fe—B—P—Cu | 40 | 170 | $1.47 \times 10^5$ |
| Example 7 | Fe—B—P—Cu | 10 | 170 | $5.9 \times 10^5$ |
| Example 8 | Fe—B—P—Cu | 40 | 120 | $7.35 \times 10^4$ |
| Example 9 | Fe—B—P—Cu | 40 | 100 | $5.1 \times 10^4$ |
| Example 10 | Fe—B—P—Cu | 40 | 80 | $3.27 \times 10^4$ |
| Comparative Example 2 | Fe—B—P—Cu | 40 | 60 | $1.84 \times 10^4$ |
| Example 11 | Fe—B—P—Cu | 60 | 170 | $9.83 \times 10^4$ |
| Example 12 | Fe—B—P—Cu | 60 | 170 | $9.83 \times 10^4$ |
| Comparative Example 3 | Fe—B—P—Cu | 60 | 60 | $1.22 \times 10^4$ |
| Example 13 | Fe—B—P | 40 | 170 | $1.47 \times 10^5$ |
| Example 14 | Fe—Si—B—P—Cu | 40 | 170 | $1.47 \times 10^5$ |
| Example 15 | Fe—Si—B—P—Cu—Cr | 40 | 170 | $1.47 \times 10^5$ |
| Example 16 | Fe—Si—B—Nb—Cr | 40 | 170 | $1.47 \times 10^5$ |
| Example 17 | Fe—Si—B—Nb—Cu | 40 | 170 | $1.47 \times 10^5$ |
| Example 18 | Fe—Si—B—Cr | 40 | 170 | $1.47 \times 10^5$ |
| Example 19 | Fe—B | 40 | 170 | $1.47 \times 10^5$ |

TABLE 2

| | particle diameter (D50) [μm] | crystallinity [%] | particle shape | Hc [Oe] |
|---|---|---|---|---|
| Comparative Example 1 | 150 | 12 | irregular | 14 |
| Example 1 | 50 | 4.2 | almost sphere | 5 |
| Example 2 | 43 | 1.6 | almost sphere | 1 |
| Example 3 | 8 | 0.2 | almost sphere | 1 |
| Example 4 | 12 | 1.0 | almost sphere | 1 |
| Example 5 | 18 | 0.8 | sphere | 1 |
| Example 6 | 22 | 1 | sphere | 1 |
| Example 7 | 10 | 0.3 | sphere | 2 |
| Example 8 | 41 | 0.7 | sphere | 1 |
| Example 9 | 48 | 1.5 | almost sphere | 2 |
| Example 10 | 85 | 3.9 | almost sphere | 7 |
| Comparative Example 2 | 115 | 5.7 | irregular | 12 |
| Example 11 | 50 | 1.0 | sphere | 1 |
| Example 12 | 77 | 2.8 | sphere | 3 |
| Comparative Example 3 | 99 | 5.7 | irregular | 14 |
| Example 13 | 18 | 0.0 | sphere | 1 |
| Example 14 | 23 | 0.8 | almost sphere | 1 |

TABLE 2-continued

|  | particle diameter (D50) [μm] | crystallinity [%] | particle shape | Hc [Oe] |
|---|---|---|---|---|
| Example 15 | 21 | 0.0 | sphere | 1 |
| Example 16 | 19 | 1.6 | almost sphere | 1 |
| Example 17 | 26 | 0.0 | almost sphere | 1 |
| Example 18 | 24 | 0.0 | almost sphere | 1 |
| Example 19 | 18 | 0.0 | sphere | 1 |

According to Tables 1 and 2, when the inner diameter of the drum is more than 100 mm as shown in Comparative Example 1, the particles have irregular shapes and bad characteristics. When the initial velocity of the coolant liquid is less than 80 m/s as shown in Comparative Examples 2 and 3, the particles have irregular shapes and bad characteristics. In contrast, the alloy particles of Examples 1 to 19 have sphere shapes or almost sphere shapes, good amorphous property and good characteristics such as small coercivity. As can be seen from Examples 8 to 10 and Comparative Example 2, when the initial velocity of the coolant liquid is 100 m/s or more, the particles are made finer, and the amorphous property and the magnetic characteristics are improved.

Examples 21 to 28 and Comparative Example 21

The relation between the supply rate of the high speed fluid made of the coolant liquid and the supply rate of the molten alloy supplied to the high speed fluid was examined under conditions shown in Table 3 attached below. The manufactured alloy powder was estimated as shown in Table 4. Examples 21 to 28 and Comparative Example 21 had an alloy composition of $Fe_{84.35}P_{8.5}B_{6.5}Cu_{0.65}$, and the initial velocity of the coolant liquid thereof was 200 m/s.

TABLE 3

|  | composition | water velocity [m/s] | high speed fluid supply rate (*1) [kg/min] | molten alloy supply rate (*2) [kg/min] | ratio (*1/*2) [times] |
|---|---|---|---|---|---|
| Example 21 | $Fe_{84.35}P_{8.5}B_{6.5}Cu_{0.65}$ | 200 | 400 | 1 | 400.0 |
| Example 22 | $Fe_{84.35}P_{8.5}B_{6.5}Cu_{0.65}$ | 200 | 400 | 2 | 200.0 |
| Example 23 | $Fe_{84.35}P_{8.5}B_{6.5}Cu_{0.65}$ | 200 | 400 | 4 | 100.0 |
| Example 24 | $Fe_{84.35}P_{8.5}B_{6.5}Cu_{0.65}$ | 200 | 400 | 5 | 80.0 |
| Example 25 | $Fe_{84.35}P_{8.5}B_{6.5}Cu_{0.65}$ | 200 | 400 | 10 | 40.0 |
| Example 26 | $Fe_{84.35}P_{8.5}B_{6.5}Cu_{0.65}$ | 200 | 400 | 15 | 26.6 |
| Example 27 | $Fe_{84.35}P_{8.5}B_{6.5}Cu_{0.65}$ | 200 | 400 | 20 | 20.0 |
| Example 28 | $Fe_{84.35}P_{8.5}B_{6.5}Cu_{0.65}$ | 200 | 400 | 25 | 16.0 |
| Comparative Example 21 | $Fe_{84.35}P_{8.5}B_{6.5}Cu_{0.65}$ | 200 | 400 | 30 | 13.3 |

TABLE 4

|  | particle diameter [μm] | amorphous ratio [%] | particle shape | Hc [Oe] |
|---|---|---|---|---|
| Example 21 | 18 | 99 | sphere | 1 |
| Example 22 | 23 | 98 | sphere | 1 |
| Example 23 | 25 | 99 | sphere | 1 |
| Example 24 | 27 | 98 | sphere | 1 |
| Example 25 | 33 | 99 | sphere | 1 |
| Example 26 | 38 | 98 | almost sphere | 1 |
| Example 27 | 44 | 97 | almost sphere | 2 |
| Example 28 | 48 | 95 | almost sphere | 5 |
| Comparative Example 21 | 56 | 78 | irregular | 14 |

According to Tables 3 and 4, when the supply rate of the high speed fluid made of the coolant liquid is 15 times or more than the supply rate of the molten alloy, the manufactured alloy particles have good amorphous property. When the supply rate of the high speed fluid is 40 times or more than the supply rate of the molten alloy, the particles have good shapes.

What is claimed is:

1. A manufacturing method of alloy powder, the manufacturing method comprising:
shaping a flowing fluid made of coolant liquid into a liquid film which has a predetermined thickness of between 0.1 mm and 15 mm by continuously supplying the coolant liquid from a nozzle onto an inner wall of a drum, the coolant liquid having an initial velocity of between 80 m/s and 800 m/s when supplied from the nozzle;
applying a predetermined acceleration to the liquid film along a thickness direction of the liquid film, wherein the predetermined acceleration is a centrifugal acceleration generated by the supplying the coolant liquid from the nozzle onto the inner wall of the drum such that the liquid film formed from the coolant liquid flows around the inner wall of the drum, and wherein the predetermined acceleration is directed toward the inner wall of the drum and has a value between $2.0 \times 10^4$ G and $1.0 \times 10^7$ G;
supplying the liquid film with molten alloy which is not divided into a size of the predetermined thickness or less; and
dividing the molten alloy into the size of the predetermined thickness or less by the flowing fluid to make alloy particles, and keeping the alloy particles in the liquid film by the predetermined acceleration so that the alloy particles are continuously in contact with the flowing fluid so as to be cooled.

2. The manufacturing method as recited in claim 1, wherein the initial velocity of the coolant liquid is at least 100 m/s.

3. The manufacturing method as recited in claim 1, wherein the predetermined acceleration is at least $3.0 \times 10^4$ G.

4. The manufacturing method as recited in claim 1, wherein the predetermined thickness is at least 0.8 mm.

5. The manufacturing method as recited in claim 1, wherein the drum has an inner diameter that is between 10 mm and 100 mm.

6. The manufacturing method as recited in claim 1, wherein the drum has an inner diameter that is between 20 mm and 60 mm.

7. The manufacturing method as recited in claim 1, wherein a supply rate of the flowing fluid is between 15 and 400 times greater than a supply rate of the molten alloy.

8. The manufacturing method as recited in claim 1, wherein the liquid film is supplied with the molten alloy in an oxidizing atmosphere.

9. The manufacturing method as recited in claim 1, wherein when the liquid film is supplied with the molten alloy, a flowing direction of the molten alloy intersects the liquid film by an angle that is between 10 and 90 degrees.

10. The manufacturing method as recited in claim 1, wherein the molten alloy is supplied only onto a predetermined region of the liquid film, the predetermined region having a diameter of at most 15 mm.

* * * * *